United States Patent
Chakraborty et al.

(10) Patent No.: US 10,215,894 B2
(45) Date of Patent: Feb. 26, 2019

(54) STAIN RESISTANT RETROREFLECTIVE ARTICLES

(71) Applicant: 3M INNOVATIVE PROPERTIES COMPANY, St. Paul, MN (US)

(72) Inventors: Ruby Chakraborty, Woodbury, MN (US); Cheryl L. S. Elsbernd, Woodbury, MN (US); Shri Niwas, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/334,408

(22) PCT Filed: Apr. 24, 2015

(86) PCT No.: PCT/US2015/027425
§ 371 (c)(1),
(2) Date: Oct. 26, 2016

(87) PCT Pub. No.: WO2015/167947
PCT Pub. Date: Nov. 5, 2015

(65) Prior Publication Data
US 2017/0059751 A1 Mar. 2, 2017

Related U.S. Application Data

(60) Provisional application No. 61/986,216, filed on Apr. 30, 2014.

(51) Int. Cl.
*G02B 5/128* (2006.01)
*B29D 11/00* (2006.01)
(Continued)

(52) U.S. Cl.
CPC ........ *G02B 5/128* (2013.01); *B29D 11/00605* (2013.01); *G02B 1/14* (2015.01); *B29K 2101/12* (2013.01); *B29K 2509/08* (2013.01)

(58) Field of Classification Search
USPC .......................... 359/534, 530, 536, 538–542
See application file for complete search history.

(56) References Cited

U.S. PATENT DOCUMENTS

| | | |
|---|---|---|
| 1,175,224 A | 3/1916 | Bleecker |
| 2,461,011 A | 2/1949 | Taylor |

(Continued)

FOREIGN PATENT DOCUMENTS

| | | |
|---|---|---|
| KR | 2012-038307 | 4/2012 |
| WO | WO 2005-098125 | 10/2005 |
| WO | WO 2015-061065 | 4/2015 |

OTHER PUBLICATIONS

International Search Report for PCT International Application No. PCT/US2015/027425, dated Jul. 2, 2015, 4 pages.

*Primary Examiner* — Jennifer D. Carruth
(74) *Attorney, Agent, or Firm* — Jeffrey M. Olofson

(57) ABSTRACT

Retroreflective articles include transparent microspheres (120) protruding from a bead bond layer (140), with reflective metal layers (130) coated on a portion of the transparent microspheres. Retroreflective articles with anti-staining properties have bead bond layers that contain one or more corrosion inhibiting compounds. At least a portion of the one or more corrosion inhibiting compounds migrates through the reflective metal layer to passivate the exposed metal surface of the reflective metal layer.

19 Claims, 1 Drawing Sheet

(51) Int. Cl.
*G02B 1/14* (2015.01)
*B29K 101/12* (2006.01)
*B29K 509/08* (2006.01)

(56) References Cited

U.S. PATENT DOCUMENTS

| | | |
|---|---|---|
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,946,130 A | 3/1976 | Tung |
| 4,192,576 A | 3/1980 | Tung |
| 4,367,919 A | 1/1983 | Tung |
| 4,564,556 A | 1/1986 | Lange |
| 4,678,695 A | 7/1987 | Tung |
| 4,758,469 A | 7/1988 | Lange |
| 4,772,511 A | 9/1988 | Wood |
| 4,931,414 A | 6/1990 | Wood |
| 5,200,262 A | 4/1993 | Li |
| 5,283,101 A | 2/1994 | Li |
| 5,474,827 A | 12/1995 | Crandall |
| 5,812,317 A | 9/1998 | Billingsley |
| 5,824,390 A | 10/1998 | Ochi |
| 6,172,810 B1 | 1/2001 | Fleming |
| 6,355,302 B1 | 3/2002 | Vandenberg |
| 6,361,850 B1 | 3/2002 | Billingsley |
| 6,548,164 B1 | 4/2003 | Bacon, Jr. |
| 7,723,452 B2 | 5/2010 | Hooftman |
| 8,414,957 B2 | 4/2013 | Enzerink |
| 2005/0162742 A1* | 7/2005 | Fleming .............. G02B 5/128 359/536 |
| 2009/0040457 A1 | 2/2009 | Nakajima |
| 2009/0099695 A1* | 4/2009 | Trevino, III ........ B01F 13/1055 700/265 |
| 2014/0118827 A1 | 5/2014 | Zhang |

\* cited by examiner

STAIN RESISTANT RETROREFLECTIVE ARTICLES

FIELD OF THE DISCLOSURE

This disclosure relates to articles that are precursors to retroreflective articles, to retroreflective articles, especially retroreflective articles which are stain resistant, and to methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric binder layer, a reflective layer, and may also have a substrate layer. The optical lens elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a binder layer over the coated microspheres. Often a pressure sensitive adhesive is applied on the binder layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

In order to decrease the susceptibility of retroreflective articles to corrosion and/or staining and improve durability and launderability, a number of techniques have been used to protect the reflective material layer. Examples of such techniques include encapsulation of the reflective article with a cover film as in U.S. Pat. No. 4,678,695 (Tung et al.). Other techniques have taught the use of layers or coatings to specifically protect the reflective layer such as U.S. Pat. No. 5,824,390 (Ochi et al.) which teaches the use of a thin film containing a coupling agent which is formed on the vapor-deposited metal layer prior to superposing the thermoformable support sheet to the bead layer, U.S. Pat. No. 5,474,827 (Crandall et al.) which incorporated a compound comprising an aromatic bidentate moiety in the binder layer which is chemically associated with the retroreflective elements, U.S. Pat. No. 5,812,317 (Billingsley et al.) which incorporated a polymeric intermediate layer between the microspheres of the retroreflective article, and U.S. Pat. No. 7,723,452 (Hooftman et al.) which teaches a method of treatment of retroreflective sheets with treatment compositions that comprise fluorinated compounds having one or more silyl groups, and an auxiliary compound. Another technique is described in U.S. Pat. No. 6,172,810 (Fleming et al.) which describes retroreflective articles with a layer of optical elements and multilayer reflective coating disposed on the optical elements, the multilayer reflective coating having multiple polymer layers with different refractive indices.

In U.S. Pat. No. 6,355,302, a different continuous process is described for making retroreflective articles in which a fabric is coated with a binder material and aluminized beads are applied to the coating of binder material. An etching station removes exposed portions of the aluminized coating from the beads after the binder material is allowed to solidify.

SUMMARY

Described herein are intermediate articles which are precursors to retroreflective articles. Also described are retroreflective articles, especially retroreflective articles with anti-staining properties, and methods of making and using them.

Described herein are intermediate articles comprising a thermoplastic polymeric carrier layer with a first major surface and a second major surface, transparent microspheres partially embedded the first major surface of the thermoplastic polymeric carrier layer, a reflective metal layer disposed on the first major surface of the thermoplastic polymeric carrier layer and the exposed surface of the partially embedded transparent microspheres, and a bead bond layer disposed on the reflective metal layer, where the bead bond layer comprises a corrosion inhibitor additive. At least a portion of the corrosion inhibitor additive has migrated through the reflective metal layer and is present on the surface of the reflective metal layer opposite to the surface in contact with the bead bond layer.

Also described are retroreflective articles which are the intermediate articles described above, from which the thermoplastic polymeric carrier layer has been removed.

Additionally, methods of preparing intermediate articles and retroreflective articles are described. In some embodiments, the method comprises providing a thermoplastic polymeric carrier layer with a first major surface and a second major surface, providing transparent microspheres, partially embedding the transparent microspheres into the first major surface of the thermoplastic polymeric carrier layer such that the beads at least partially protrude from the first major surface of the thermoplastic polymeric carrier layer, depositing a metal reflective layer on the first major surface of the thermoplastic polymeric carrier layer and the exposed surface of the partially embedded transparent microspheres, providing a bead bond composition, the bead bond composition comprising at least one bead bond polymer and a corrosion inhibitor additive, and applying the bead bond composition to the deposited metal reflective layer, to form a bead bond layer. At least a portion of the corrosion inhibitor additive migrates through the reflective metal layer and is present on the surface of the reflective metal layer opposite to the surface in contact with the bead bond layer. In some embodiments, the method further comprises removing the thermoplastic polymeric carrier layer, to form a retroreflective article.

BRIEF DESCRIPTION OF THE DRAWINGS

The present application may be more completely understood in consideration of the following detailed description of various embodiments of the disclosure in connection with the accompanying drawings.

Figure 1:
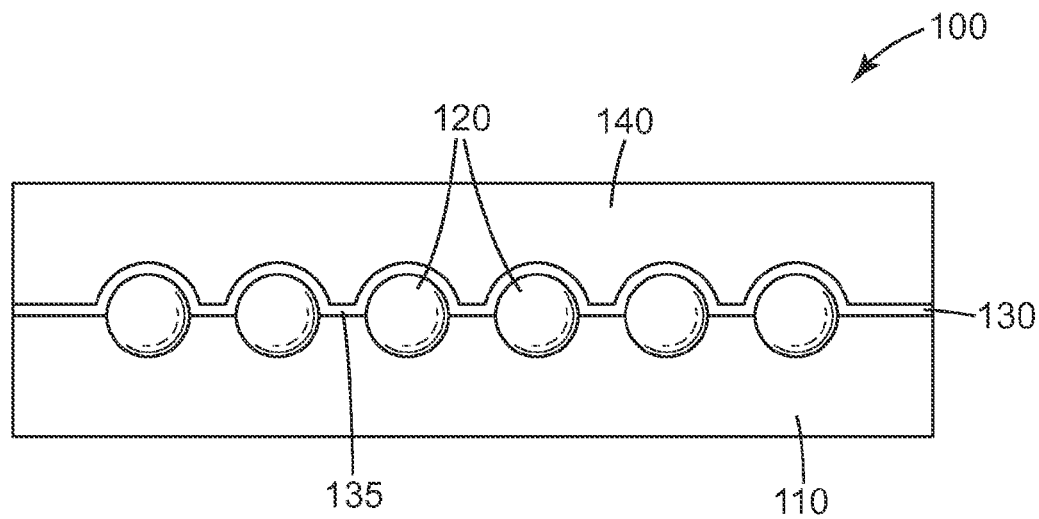
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective articles. In some applications, an entire article may be made retroreflective; in others, a portion of the article may be made retroreflective through the use of one or more retroreflective appliqués. The retroreflective articles typically have an optical element layer, a polymeric binder layer (typically called a bead bond layer), and a reflective layer. The optical elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

Typically retroreflective articles are prepared in a multi-step process. In this process, a thermoplastic polymeric carrier layer has a plurality of transparent microspheres partially embedded in it. A reflective layer, typically a reflective metal layer such as aluminum, silver or the like, is applied to the protruding transparent microspheres. A bead bond layer is applied to the coated microsphere layer, a transfer adhesive or fabric is adhered to the bead bond layer, and the thermoplastic polymeric carrier layer is removed to generate the retroreflective article.

One consequence of this process is that the reflective metal layer is not only present on the transparent microspheres, but is also located on the spaces between the transparent microspheres. The spaces between the transparent microspheres are often referred to as "interstitial spaces" and the reflective metal located in these interstitial spaces is referred to as "interstitial metal". Upon removal of the thermoplastic polymeric carrier layer, the reflective metal layer present in the interstitial spaces is exposed.

The interstitial metal, because it is exposed, is vulnerable to corrosion; this is particularly true when the retroreflective article is exposed to sweat or other fluids. Oftentimes this exposure occurs when the garment assembler secures the appliqué to an article of clothing or the like. During shipment or storage of the retroreflective article, the areas of interstitial metal exposed to sweat or other fluids corrode, leading to the appearance of a stain on the new retroreflective article which is aesthetically undesirable.

In this disclosure, methods are described for forming retroreflective articles where the reflective metal layer is passivated, that is to say that it is made less susceptible to corrosion and/or staining. This passivation is achieved by the addition of one or more corrosion inhibiting compounds to the bead bond layer. This passivation is very surprising because the corrosion inhibiting compounds are not applied to the side of the reflective metal layer that is exposed to the environment, rather the corrosion inhibiting compounds are present in the bead bond layer, and the bead bond layer is in contact with the side of the reflective metal layer that is opposite to the side that is exposed to the environment.

While not wishing to be bound by theory, it is believed that at least a portion of the corrosion inhibiting compound present in the bead bond layer migrates through the reflective metal coating and passivates the opposite surface of the reflective metal layer. In this way the corrosion inhibiting compound is able to provide corrosion resistance to the exposed surface of the reflective metal layer even though the corrosion inhibiting compound is not applied to the exposed reflective metal surface.

The addition of a variety of compounds to the bead bond layer to affect the bead bond layer-reflective metal layer interaction is known. For example, U.S. Pat. No. 5,474,827 (Crandall et al.) describes adding a compound comprising an aromatic bidentate moiety to the binder layer to increase the adhesion of the binder layer to the retroreflective elements (reflective metal layer and transparent beads). In this way the laundering durability is increased because the stronger adhesion helps to prevent the loss of the retroreflective elements during laundering.

In the present disclosure, in contrast, the addition of corrosion inhibiting compounds to the bead bond layer is affecting not the bead bond-reflective metal layer interaction, but rather is affecting the opposite side of the reflective metal layer by providing corrosion resistance to the exposed reflective metal surface. The presence of the corrosion inhibiting compounds on the exposed reflective metal surface is evidenced by the improved corrosion resistance of articles in which corrosion inhibitor compounds are added to the bead bond layer. Additionally, in some embodiments, direct analytical evidence of the presence of corrosion inhibiting compounds on the exposed metal surface has been obtained.

Additionally, in some embodiments the bead bond layer may also include additional additives such as aluminum flakes. These aluminum flakes are added to color the bead bond layer and give it a metallic look similar to the reflective metal layer. These aluminum flakes can also become corroded. Thus the presence in the bead bond layer of corrosion inhibitor compounds also provide the additional desirable feature of preventing corrosion of the aluminum flakes present in the bead bond layer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Unless otherwise indicated, the terms "transparent" and "optically transparent" are used interchangeably and refer to an article, film or adhesive that has a high light transmittance over at least a portion of the visible light spectrum (about 400 to about 700 nm).

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "hydrocarbon-based group" as used herein refers to a group that contains at least carbon and hydrogen atoms and may also contain additional atoms. Examples of hydrocarbon-based groups are ones that include alkyl groups, aryl groups, alkylene groups, and arylene groups, or combinations thereof.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

The term "alkoxy" refers to a monovalent group of the formula —OR, where R is an alkyl group.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

Disclosed herein are methods of preparing retroreflective articles. These methods involve the preparation of an intermediate article, also sometimes called a precursor article, which comprises a thermoplastic polymeric carrier layer, a layer of transparent microspheres embedded in the thermoplastic polymeric carrier layer, a treated metal reflective layer adjacent to the layer of transparent microspheres, and a bead bond layer adjacent to the treated metal reflective layer. In some embodiments, a layer may also be applied to the bead bond layer, such as a transfer adhesive layer or a fabric layer, for example. This intermediate article can be converted to a final retroreflective article by removing the thermoplastic polymeric carrier layer. Each of the steps involved in preparing this intermediate article, as well the steps involved in forming the final retroreflective articles of this disclosure, are presented in detail below.

The methods to form the intermediate article comprise providing a thermoplastic polymeric carrier layer with a first major surface and a second major surface, providing transparent microspheres, and partially embedding the transparent microspheres into the first major surface of the thermoplastic polymeric carrier layer such that the beads at least partially protrude from the first major surface of the thermoplastic polymeric carrier layer. A metal reflective layer is deposited on the first major surface of the thermoplastic polymeric carrier layer and the exposed surface of the partially embedded transparent microspheres, to form a reflective metal layer. A bead bond layer composition is applied to the deposited metal reflective layer. The bead bond layer composition comprises at least one bead bond polymer or prepolymer and at least one corrosion inhibitor compound. In some embodiments, the bead bond layer may be dried and/or cured, depending upon the nature of the bead bond layer composition. If the bead bond composition comprises a prepolymer composition, that is to say that it contains elements that upon polymerization form the polymer components of bead bond layer, curing of the bead bond layer can be carried out to form the polymeric components of the bead bond layer. In some embodiments, a layer is applied to the bead bond layer, typically this layer is a transfer adhesive layer or a fabric layer.

This intermediate article can be immediately subjected to additional steps to generate the final retroreflective article, or the intermediate article can be stored for later use, shipped to another location, or subjected to additional processing steps such as cutting, attachment to a substrate, and the like. It is desirable to form this intermediate article, because this intermediate article can be stored, shipped, or processed without exposing the transparent microsphere layer. Once the transparent microsphere layer is exposed it is subject to potential damage from abrasion, staining, and the like.

When it is desired to form the final retroreflective article, the thermoplastic polymeric carrier layer is removed to expose the transparent microsphere layer and interstitial reflective metal layer.

A wide variety of materials and combinations of materials are suitable for the thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the thermoplastic polymeric carrier layer. The monolayer of transparent microspheres is assembled by cascading transparent microspheres onto the thermoplastic polymeric carrier layer, which secures the microspheres in a desired temporary assignment. Typically, the thermoplastic polymeric carrier layer is heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the thermoplastic polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used in this disclosure are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

A reflective material such as a specularly reflective metal is then applied to the thermoplastic polymeric carrier layer and the microspheres so that the protruding portions of the microspheres, as well as the exposed portions of thermoplastic polymeric carrier layer, become coated with a reflective material layer. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specularly reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick.

A bead bond composition is applied to the reflective metal layer to form a bead bond layer. The bead bond composition comprises at least one bead bond polymer or prepolymer and at least one corrosion inhibitor compound. If desired, and depending upon the nature of the bead bond composition, the bead bond layer may be dried and/or cured. For example, if the bead bond composition is a solvent-borne composition, the layer can be dried to remove the solvent. Also, if the bead bond composition comprises a prepolymer composition, that is to say that it contains elements that upon polymerization form the polymer components of bead bond layer, curing of the bead bond layer can be carried out to form the polymeric components of the bead bond layer.

This bead bond layer completely covers the reflective metal layer and is generally 50-250 micrometers thick, more typically 50 to 150 micrometers thick. A wide range of polymeric materials are suitable for use in the bead bond layer. Examples of suitable polymeric materials include materials that contain functional groups including urethanes, esters, ethers, ureas, epoxies, carbonates, (meth)acrylates, olefins, vinyl chlorides, amides, alkyds, and combinations thereof.

Particularly suitable polymers are phenol resole/rubber resins, crosslinked poly(urethane-ureas) and crosslinked poly(acrylates). Poly(urethane-ureas) may be formed by reacting a hydroxy-functional polyester resin with excess polyisocyanate. Alternatively, a polypropylene oxide diol may be reacted with a diisocyanate and then with a triamino-functionalized polypropylene oxide. Crosslinked poly(acrylates) may be formed by exposing acrylate oligomers to electron beam radiation such as is described, for example, In U.S. Pat. No. 5,283,101 (Li).

Examples of commercially available polymers that may be used in the bead bond layer include: NIPOL NBR 1001LG available from Zeon Chemicals, Louisville, Ky.; BRJ-473 available from SI Group, Inc, Schenectady, N.Y.; VITEL 3550B available from Bostik, Inc., Middleton, Mass.; EBECRYL 230 available from Allnex, Smryna, Ga.; JEFFAMINE T-5000, available from Huntsman Corporation, Houston, Tex.; and ACCLAIM 8200, available from Bayer Material Science, LLC, Pittsburg, Pa.

A wide variety of corrosion inhibitor compounds can be added to the bead bond compositions of this disclosure. A single corrosion inhibitor compound may be used or a mixture of different corrosion inhibitor compounds may be used. In some embodiments, the corrosion inhibitor compound comprises one or more inorganic corrosion inhibitor compounds. In other embodiments, the corrosion inhibitor compound comprises one or more organic corrosion inhibitor compounds. In still other embodiments, the corrosion inhibitor comprises a mixture of an inorganic corrosion inhibitor compound and an organic corrosion inhibitor compound.

As used herein, the term "corrosion inhibitor compound" refers to any compound which is capable of inhibiting the corrosion of a metal surface, especially an aluminum surface. Suitable classes of corrosion inhibitor compounds are described below. Many corrosion inhibitor compounds are commercially available, typically being supplied as a solution or dispersion in one or more solvents. Since the bead bond layer is typically dried or cured after being applied, generally, the corrosion inhibitor compounds can be added to the bead bond layer composition as a solution or dispersion.

Among the classes of suitable corrosion inhibitor compounds are inorganic corrosion inhibitor compounds and organic corrosion inhibitor compounds. One or more inorganic corrosion inhibitor compounds or one or more organic corrosion inhibitor compounds can be used, or a combination of one or more inorganic corrosion inhibitor compounds and one or more organic corrosion inhibitor compounds can be used in combination.

Among the suitable inorganic corrosion inhibitor compounds are metal salts. These metal salts contain a metal cation and an anion. Examples of metal cations include cations of calcium, magnesium, zinc, barium, or strontium. The anion comprises one or more anionic groups. Examples of suitable anionic groups include phosphates, carboxylates, sulfates, nitrates, silicates, borosilicates, phosphosilicates, nitrites, and the like. Examples of suitable inorganic corrosion inhibitors include calcium phosphate, magnesium phosphate, barium phosphosilicate, calcium borosilicate, calcium phosphosilicate, zinc phosphate, strontium phosphosilicate, nitrite salts of barium strontium or calcium, or sulfate salts of barium, strontium, or calcium. In some embodiments, the metal salt comprises a calcium salt or a magnesium salt, in particular a calcium phosphate salt, a magnesium phosphate salt, or a salt that is a combination of a calcium phosphate and magnesium phosphate.

Among the suitable organic corrosion inhibitor compounds are a wide variety of bifunctional compounds of type R—X, where R is a hydrocarbon-based group and X is a group that contains one or more polar groups that can ligate the surface of the reflective metal layer. Examples of polar groups that can ligate the surface of the reflective metal layer include hydroxyl groups, carboxylic acid groups, amine groups, mercapto groups and the like as well as the ionic groups described below. In some embodiments the X group may be a monodentate polar group (i.e. the X group contains a single polar group or only one atom in the ligand binds to the metal), in other embodiments the X group may be a bidentate polar group (i.e. the X group contains two polar groups or two atoms in the ligand that bind to the metal).

The polar groups of the organic corrosion inhibitor compound may be ionic or nonionic polar groups. If the groups are ionic, the anionic functionality is typically balanced with a non-metallic cation such as an ammonium ion. In some embodiments, the organic corrosion inhibitor may have an anionic portion that is a simple anion such as a halide anion, with an ammonium cation, such as for example the benzyl quarternary ammonium chloride compounds commercially available from Weatherford, Midland, Tex. under the "ALPHA" trade name, such as ALPHA 1018, ALPHA 1028, ALPHA 1038, ALPHA 1458, ALPHA 1505, ALPHA 3013, and ALPHA 3444.

The R group is a hydrocarbon-based group that may be aliphatic, aromatic or a combination thereof. Additionally, the hydrocarbon-based group may contain one or more heteroatoms or heteroatom-based functional groups. Examples of suitable heteroatoms include halogens (F, Cl, Br, I atoms), nitrogen atoms, oxygen atoms, sulfur atoms, and the like. The hydrocarbon-based group typically contains between 2 and 40 carbon atoms, more typically 4 to 20 carbon atoms, or even 6 to 16 carbon atoms.

Classes of suitable organic corrosion inhibitor compounds include: phosphate esters of fatty acids or amino acids; sulfate quaternary compounds such as the diethylsulfate quaternary compounds commercially available from Weatherford, Midland, Tex. as ALPHA 1080; coconut quaternary compounds such as ALPHA 2095 and ALPHA 2129 commercially available from Weatherford, Midland, Tex.; amine ethoxylates such as CI 815 commercially available from Weatherford, Midland, Tex.; imidazoline, amide and polyamides such as ALPHA 1153, ALPHA 1156, ALPHA 1158, ALPHA 1215, ALPHA 1335, ALPHA 3375, and ALPHA 3405 commercially available from Weatherford, Midland, Tex.; organic acid amine salts such as ALPHA 3337, ALPHA 3370, ALPHA 3403, ALPHA 3461, and ALPHA 3488 commercially available from Weatherford, Midland, Tex., PCCI 40 commercially available from Primary Chemicals, Houston, Tex., and the aromatic succinic acid compounds commercially available from HALOX, Hammond, Ind. under the trade name "HALOX", such as HALOX 430, HALOX 550, HALOX 630, and HALOX 650; phosphate esters such as ALPHA 2290, ALPHA 2296, and ALPHA 3385 commercially available from Weatherford, Midland, Tex. and PCCI 10 commercially available from Primary Chemicals, Houston, Tex.; amine bisulfites such as such as ALPHA 1064 commercially available from Weatherford, Midland, Tex.; and organic boron compounds such as such as ALPHA 3220 commercially available from Weatherford, Midland, Tex.

Among the most suitable organic corrosion inhibitor compounds are aromatic succinic acid compounds such as those commercially available from HALOX, Hammond, Ind. under the trade name "HALOX", such as HALOX 430, HALOX 550, HALOX 630, and HALOX 650.

Typically the corrosion inhibitor compound or compounds are an additive to the bead bond layer composition, meaning that the bead bond layer composition comprises less than 50% by weight of corrosion inhibitor compound or compounds. More typically, the amount of corrosion inhibitor additive (meaning the total of all added corrosion inhibitor compound or compounds) is in the range of 0.5 to 20 weight % based upon the bead bond composition as coated onto the metal layer prior to drying/curing. In some embodiments, the amount of corrosion inhibitor additive is in the range of 1.0 to 20 weight %, or even 2.0 to 15 weight %. The amount of corrosion inhibitor additive used will depend upon a wide range of considerations including the nature of the polymeric components in the bead bond composition, the presence or absence of other additives in the bead bond composition, the desired use for the formed articles, etc.

The bead bond composition containing the corrosion inhibitor compound may be applied in a variety of ways, such as by coating or by lamination. In embodiments where the bead bond layer composition containing the corrosion inhibitor compound is applied as a coating, the liquid bead bond material containing the corrosion inhibitor compound may be coated either as a solution or as a 100% solids composition. Typically, 100% solids compositions are applied as a hot melt coating. After coating, the applied bead bond layer material containing the corrosion inhibitor compound is allowed to cool or dry, and optionally cured and/or crosslinked to form the bead bond layer. In other embodiments, a sheet of the bead bond layer material containing the corrosion inhibitor compound is laminated to the reflective metal layer. The laminated sheet of bead bond material may be heated to cure and/or crosslink to form the bead bond layer.

As was discussed above, the intermediate article comprising a thermoplastic polymeric carrier layer, a layer of transparent microspheres embedded in the thermoplastic polymeric carrier layer, a metal reflective layer adjacent to the layer of transparent microspheres, and a bead bond layer adjacent to the treated metal reflective layer can be immediately subjected to additional steps to generate the final retroreflective article, or the intermediate article can be stored for later use, shipped to another location, or subjected to additional processing steps such as cutting, attachment to a substrate, and the like. Removal of the thermoplastic polymeric carrier layer can be carried out in a variety of ways, either manually or mechanically.

As was mentioned above, a variety of additional processing steps can be carried out with the intermediate article. Examples of these optional steps include cutting the article to the desired size and shape, application of an adhesive layer to the bead bond layer to permit the article to be attached to a substrate, and applying a backing to the bead bond layer.

Examples of suitable adhesive layers include pressure sensitive adhesives, heat activated adhesives, and laminating adhesives. The adhesive layer may be applied to the bead bond layer by coating or by lamination of a formed adhesive layer to the bead bond layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

The adhesive layer can be used to adhere the intermediate article to a wide range of substrates. These substrates may be the surface of an article, such as the surface of a tire, the surface of a sign, or the surface of a piece of clothing, for example. The substrate may also be backing materials such as films, foams, or fabrics, or a variety of woven or nonwoven webs.

In some embodiments, the intermediate article can be adhered to a substrate without the use of an adhesive layer. For example, the bead bond layer can act as an attachment layer, and can adhere to a substrate if the bead bond layer is contacted to the substrate while still molten or prior to crosslinking. The substrate may be the surface of an article, such as the surface of a tire, the surface of a sign, or the surface of a piece of clothing, or the substrate may comprise backing materials such as films, foams, or fabrics, or a variety of woven or nonwoven webs.

Additionally, one or more of these optional processing steps may be carried out after the thermoplastic polymeric carrier layer has been removed to form the final retroreflective article, but as mentioned above, it is advantageous to carry out these steps while the retroreflective bead surface is still protected by the thermoplastic polymeric carrier layer.

Also disclosed herein are a variety of retroreflective articles prepared using the methods described above, including intermediate articles in which the thermoplastic polymeric carrier layer is attached to the article, and final articles in which the thermoplastic polymeric carrier layer has been removed.

The intermediate articles comprise a thermoplastic polymeric carrier layer with a first major surface and a second major surface, transparent microspheres partially embedded in the first major surface of the thermoplastic polymeric carrier layer, a reflective metal layer disposed on the first major surface of the thermoplastic polymeric carrier layer and the exposed surface the partially embedded transparent microspheres, and a bead bond layer disposed on the reflective metal layer, where the bead bond layer comprises a corrosion inhibitor additive. At least a portion of the corrosion inhibitor additive migrates through the reflective metal layer and is present on the surface of the reflective metal layer opposite to the surface in contact with the bead bond layer. Each of these layers is described in detail above.

The bead bond layer is formed from a bead bond composition. The bead bond composition includes at least one polymeric component or pre-polymer component that forms a polymeric component upon curing. Additionally, the bead bond composition also comprises at least one corrosion inhibitor compound which is the corrosion inhibitor additive of the bead bond layer. The bead bond composition may also include a variety of additional additives besides the corrosion inhibitor compound. Among these additives are coloring additives such as metal flakes, pigments, dyes or a combination thereof, stabilizers such as antioxidants, UV absorbers and the like, or viscosity or flow modifiers. In some embodiments, it may be desirable to include metal flakes, especially aluminum flakes, in the bead bond layer. These metal flakes act as coloring agents to give the bead bond layer a metallic look that matches with the metallic look of the reflective metal layer. An added advantage of bead bond layers of the present disclosure is that the use of corrosion inhibitor additives in the bead bond layer also helps to prevent corrosion of the metal flake colorants present in the bead bond layers.

As described above, the intermediate article may comprise a variety of optional layers. In some embodiments, the intermediate article further comprises a layer of adhesive disposed on the bead bond layer. This adhesive may be a pressure sensitive adhesive, a heat activated adhesive, or a curable adhesive such as a laminating adhesive. The adhesive layer may be applied to the bead bond layer by coating or by lamination of a formed adhesive layer to the bead bond layer. The adhesive layer may be covered by a release liner if desired, especially if the adhesive is a pressure sensitive adhesive.

In some embodiments, the bead bond layer may be adhered to a wide variety of substrates, as described above. The substrate may be the surface of an article, such as the surface of a tire, the surface of a sign, or the surface of a piece of clothing, or the substrate may comprise backing materials such as films, foams, or fabrics, or a variety of woven or nonwoven webs.

FIG. 1 shows a cross-sectional view of an embodiment of an intermediate article of this disclosure. In FIG. 1, article 100 includes thermoplastic polymeric carrier layer 110, with transparent microspheres 120 partially embedded therein. Metal reflective coating layer 130 is adhered to the transparent microspheres 120 and to portions of thermoplastic polymeric carrier layer 110 which lie between the transparent microspheres. Bead bond layer comprising at least one corrosion inhibitor additive 140 covers the reflective metal layer 130. At least a portion of the corrosion inhibitor additive of bead bond layer 140 has migrated through reflective metal layer 130 and is located on surface 135.

Also disclosed herein are final retroreflective articles, which are articles from which the thermoplastic polymeric carrier layer has been removed. This removal can be carried out in a variety of ways, either manually or mechanically.

As described above, the final retroreflective article may comprise a variety of optional layers. Typically these optional layers are incorporated into the intermediate article prior to removal of the thermoplastic polymeric carrier layer, but if desired, these optional layers can be incorporated into the article after the removal of the thermoplastic polymeric carrier layer. In some embodiments, the final retroreflective article further comprises a layer of adhesive disposed on the bead bond layer. This adhesive may be a pressure sensitive adhesive, a heat activated adhesive, or a curable adhesive such as a laminating adhesive. The adhesive layer may be applied to the bead bond layer by coating or by lamination of a formed adhesive layer to the bead bond layer. The adhesive layer may be covered by a release liner if desired, especially if the adhesive is a pressure sensitive adhesive.

In some embodiments, the bead bond layer may be adhered to a wide variety of substrates, as described above. The substrate may be the surface of an article, such as the surface of a tire, the surface of a sign, or the surface of a piece of clothing, or the substrate may comprise backing materials such as films, foams, or fabrics, or a variety of woven or nonwoven webs.

Figure 2:
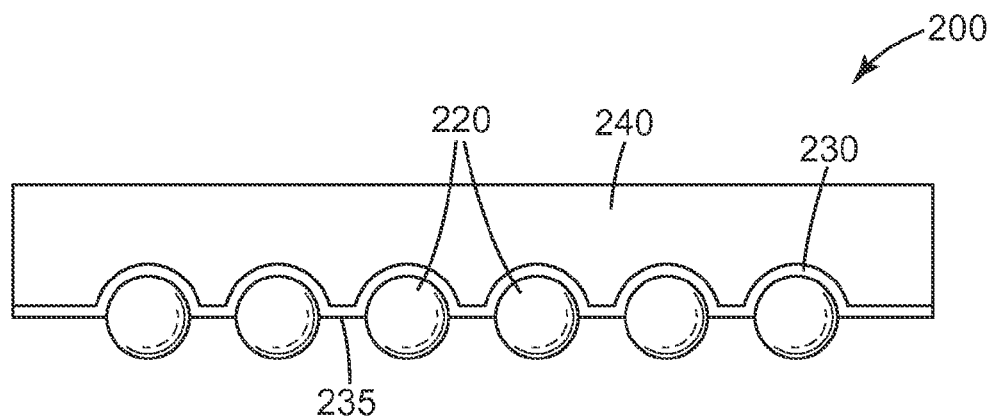
FIG. 2 shows a cross-sectional view of an embodiment of an article of this disclosure.

FIG. 2 shows a cross-sectional view of an embodiment of a retroreflective article of this disclosure. FIG. 2 is the article of FIG. 1 in which the thermoplastic polymeric carrier layer 110 has been removed. In FIG. 2, article 200 includes transparent microspheres 220 with metal reflective coating layer 230, partially embedded in bead bond layer 240, where the bead bond layer 240 comprises at least one corrosion inhibitor additive. The surface 235 of reflective metal layer 230 in FIG. 2, corresponds to regions 135 in FIG. 1, are regions where at least a portion of the corrosion inhibitor additive of bead bond layer 240 has migrated through reflective metal layer 230.

The articles of this disclosure have a number of desirable properties, most notable being the fact that they are retroreflective. Typically, the coefficient of retroreflection for articles of this disclosure, as measured in accordance with ASTM E 810-03 with an entrance angle of ±5° and an observation angle of 0.2°, is at least 330 cd $lx^{-1}m^{-2}$.

As mentioned above, the migration of corrosion inhibitor compounds from the bead bond layer to the opposite surface of the reflective metal layer produce retroreflective articles that are stain resistant, i.e. that they have desirable anti-staining properties, meaning that their appearance does not change upon exposure to sweat or other fluids. These anti-staining properties and techniques for characterizing them are further described in the Examples section.

The retroreflective articles of this disclosure can be incorporated into a wide variety of commercial articles to impart retroreflectivity to the commercial articles. Examples of suitable commercial articles include: display articles such as signs, billboards, pavement markings, and the like; transportation articles such as bicycles, motorcycles, trains, buses, and the like; and clothing articles such as shirts, sweaters, sweatshirts, jackets, coats, pants, shoes, socks, gloves, belts, hats, suits, one-piece body garments, vests, bags, and backpacks, and the like.

The present disclosure includes the following embodiments:

Among the embodiments are retroreflective articles. The first embodiment includes an article comprising: a thermoplastic polymeric carrier layer with a first major surface and a second major surface; transparent microspheres partially embedded the first major surface of the thermoplastic polymeric carrier layer; a reflective metal layer disposed on the first major surface of the thermoplastic polymeric carrier layer and the exposed surface of the partially embedded transparent microspheres; and a bead bond layer disposed on the reflective metal layer, wherein the bead bond layer comprises a corrosion inhibitor additive, wherein at least a portion of the corrosion inhibitor additive has migrated through the reflective metal layer and is present on the surface of the reflective metal layer opposite to the surface in contact with the bead bond layer.

Embodiment 2 is the article of embodiment 1, wherein the corrosion inhibitor additive comprises an inorganic corrosion inhibitor additive.

Embodiment 3 is the article of embodiment 2, wherein the inorganic corrosion inhibitor additive comprises a metal salt.

Embodiment 4 is the article of embodiment 3, wherein the metal salt comprises a salt of calcium, magnesium, zinc, barium, or strontium.

Embodiment 5 is the article of embodiment 3 or 4, wherein the metal salt comprises a calcium phosphate salt.

Embodiment 6 is the article of embodiment 1, wherein the corrosion inhibitor additive comprises an organic corrosion inhibitor additive.

Embodiment 7 is the article of embodiment 6, wherein the organic corrosion inhibitor additive comprises at least one functional group capable of ligating the surface of the reflective metal layer.

Embodiment 8 is the article of embodiment 6 or 7, wherein the organic corrosion inhibitor additive comprises an aromatic succinic acid compound.

Embodiment 9 is the article of any of embodiments 1-8, wherein the corrosion inhibitor additive comprises a combination of at least one inorganic corrosion inhibitor additive and at least one organic corrosion inhibitor additive.

Embodiment 10 is the article of any of embodiments 1-9, wherein the bead bond layer comprises 0.5-20% by weight of corrosion inhibitor additive.

Embodiment 11 is the article of any of embodiments 1-9, wherein the bead bond layer comprises 1.0-20% by weight of corrosion inhibitor additive.

Embodiment 12 is the article of any of embodiments 1-9, wherein the bead bond layer comprises 2.0-20% by weight of corrosion inhibitor additive.

Embodiment 13 is the article of any of embodiments 1-12, wherein the bead bond layer comprises one or more additional additives.

Embodiment 14 is the article of embodiment 13, wherein the one or more additional additives comprises one or more colorants.

Embodiment 15 is the article of embodiment 14, wherein the one or more colorants comprises aluminum flakes.

Embodiment 16 is the article of any of embodiments 1-15, further comprising at least one additional layer disposed on the bead bond layer, the additional layer comprising a layer of adhesive and/or a backing layer.

Embodiment 17 is the article of embodiment 16, wherein the additional layer comprises a layer of adhesive and a fabric backing.

Embodiment 18 is the article of any of embodiments 1-17, wherein the thermoplastic polymeric carrier layer has been removed to expose the transparent microspheres and portions of the reflective metal layer.

Embodiment 19 is the article of embodiment 18, wherein the article has improved stain resistance compared to an article without a corrosion inhibitor additive in the bead bond layer.

Among the embodiments are methods of preparing retroreflective articles. Embodiment 20 includes a method of preparing a retroreflective article comprising: providing a thermoplastic polymeric carrier layer with a first major surface and a second major surface; providing transparent microspheres; partially embedding the transparent microspheres into the first major surface of the thermoplastic polymeric carrier layer such that the beads at least partially protrude from the first major surface of the thermoplastic polymeric carrier layer; depositing a metal reflective layer on the first major surface of the thermoplastic polymeric carrier layer and the exposed surface of the partially embedded transparent microspheres; providing a bead bond composition, the bead bond composition comprising at least one bead bond polymer and a corrosion inhibitor additive; and applying the bead bond composition to the deposited metal reflective layer, to form a bead bond layer.

Embodiment 21 is the method of embodiment 20, wherein providing a bead bond composition comprises mixing the at least one bead bond polymer or prepolymer with the corrosion inhibitor additive.

Embodiment 22 is the method of embodiment 20, wherein the bead bond composition further comprises a solvent, and wherein applying the bead bond composition to the deposited metal reflective layer, to form a bead bond layer further comprises drying and/or curing of the composition.

Embodiment 23 is the method of any of embodiments 20-22, wherein at least a portion of the corrosion inhibitor additive migrates through the reflecting metal layer to the surface of the reflective metal layer opposite to the surface in contact with the bead bond layer.

Embodiment 24 is the method of any of embodiments 20-23, wherein the deposited metal reflective layer has a thickness of from about 50 nanometers to about 150 nanometers.

Embodiment 25 is the method of any of embodiments 20-24, wherein the deposited reflective metal layer comprises aluminum.

Embodiment 26 is the method of any of embodiments 20-25, further comprising applying at least one additional layer to the bead bond layer.

Embodiment 27 is the method of embodiment 26, wherein the at least one additional layer comprises an adhesive layer.

Embodiment 28 is the method of embodiment 27, further comprising applying a fabric backing to the adhesive layer.

Embodiment 29 is the method of embodiment 26, wherein the at least one additional layer comprises a fabric backing to the bead bond layer.

Embodiment 30 is the method of any of embodiments 20-29, further comprising removing the thermoplastic polymeric carrier layer, to form a retroreflective article.

Embodiment 31 is the method of any of embodiments 20-30, wherein the bead bond composition further comprises at least one additional additive.

Embodiment 32 is the method of embodiment 31, wherein the at least one additional additive comprises one or more colorants.

Embodiment 33 is the method of embodiment 32, wherein the one or more colorants comprises aluminum flakes.

EXAMPLES

These examples are merely for illustrative purposes only and are not meant to be limiting on the scope of the appended claims. All parts, percentages, ratios, etc. in the examples and the rest of the specification are by weight, unless noted otherwise. The following abbreviations are used: cm=centimeters; in=inches; oz/sy=ounces per square yard; RH=Relative Humidity.

Table of Abbreviations

| Abbreviation | Description |
| --- | --- |
| Treatment Material | Corrosion Inhibitor commercially available from Halox, Hammond, IN as "Halox 550". |
| VCBS | Vapor Coated Bead Sheet, prepared as described in Synthesis Example 1 below. |
| Bead Bond | Bead bond layer material prepared from acrylonitrile butadiene rubber (NBR) and a phenol-cresol resole resin solution. |
| Film Adhesive | Adhesive film commercially available from Bemis Associates, Shirley, MA |
| Fabric | Poly cotton available from Springs Industries, Rock Hill SC. |

Synthesis Example 1: Preparation of VCBS

For each of the Examples, glass microspheres having an average diameter of about 40 to 90 micrometers were partially embedded in a thermoplastic polymeric carrier layer. The thermoplastic polymeric carrier layer contained juxtaposed paper and polyethylene layers, and the microspheres were embedded in the polyethylene layer. A specularly reflective aluminum layer was vapor deposited over the thermoplastic polymeric carrier layer and the protruding portions of the glass microspheres to form a monolayer of retroreflective elements.

Test Methods:

Stain Test

Samples of retroreflective sheeting were tested for staining properties by placing 1 drop of a series of test solutions (listed below) on different locations of the reflective side of the sheeting and allowing the drops of solution to dry overnight. Alternatively, similar samples were tested for staining properties by applying human sweat onto the reflective side of the sheeting. The test samples were then placed in a constant temperature and humidity chamber set to 32° C./90% RH for approximately 60 hours, after which time the test samples were removed from the chamber, rinsed with deionized water, and dried. Staining properties were determined by observing whether the area that was thus tested produces an observable stain. The results are reported as "Stain" if staining was observed or "No Stain" if no staining was observed.

Test Solutions pH 4.00 Buffer Solution: potassium acid phthalate.
pH 6.00 Buffer Solution: citric acid/sodium hydroxide solution
pH 7.00 Buffer Solution: dibasic sodium phosphate, monobasic potassium phosphate.
pH 8.00 Buffer Solution: dibasic sodium phosphate, monobasic potassium phosphate
Artificial Sweat: Stabilized Eccrine commercially available from Pickering Laboratories, Mountain View, Calif.
Human Sweat: Obtained from a subject's forehead area after aerobic exercising.

EXAMPLES

Example 1 and Comparative Example C1

For Example 1, a modified bead bond composition was prepared by combining 2 parts by weight of Treatment Material in bead bond resin, and mixing for 5 minutes. This mixture was coated onto a 30.5×61.0 cm (12×24 in) sheet of VCBS using a lab scale notch bar coater set to 7 mil gap. It was followed by heating in an oven at 66° C. for 2.5 minutes and then at 166° C. for 6.0 minutes. To the bead bond side of the sheet, an Adhesive film of the same size was laminated with a platen laminator. The temperature was set to 177° C. The resulting transfer film was cut into 2 in×6 in long coupons and laminated onto Fabric. The thermoplastic layers of the VCBS portion of the coupons were removed. For Comparative Example C1, identical 2 in×6 in coupons were prepared that did not consist of the modified bead bond composition (the bead bond does not contain Treatment Material). The Example samples and Comparative Example samples were tested using the Stain Test method described above. The results are shown in Table 1 below.

TABLE 1

| Test Solution | Example 1 | Comparative Example C1 |
| --- | --- | --- |
| Human Sweat | Partial stain | Stain |
| Artificial Sweat | No Stain | Stain |
| pH 4.00 Buffer Solution | No Stain | Stain |
| pH 6.00 Buffer Solution | No Stain | Stain |
| pH 7.00 Buffer Solution | No Stain | Stain |
| pH 8.00 Buffer Solution | Partial Stain | Stain |

What is claimed is:

1. An article comprising:
   a thermoplastic polymeric carrier layer with a first major surface and a second major surface;
   transparent microspheres partially embedded in the first major surface of the thermoplastic polymeric carrier layer;
   a reflective metal layer disposed on the first major surface of the thermoplastic polymeric carrier layer and the exposed surface of the partially embedded transparent microspheres; and
   a bead bond layer disposed on the reflective metal layer, wherein the bead bond layer comprises a corrosion inhibitor additive, wherein at least a portion of the corrosion inhibitor additive has migrated through the reflective metal layer and is present on the surface of the reflective metal layer opposite to the surface in contact with the bead bond layer.

2. The article of claim 1, wherein the corrosion inhibitor additive comprises an inorganic corrosion inhibitor additive.

3. The article of claim 2, wherein the inorganic corrosion inhibitor additive comprises a metal salt.

4. The article of claim 3, wherein the metal salt comprises a salt of calcium, magnesium, zinc, barium, or strontium.

5. The article of claim 3, wherein the metal salt comprises a calcium phosphate salt.

6. The article of claim 1, wherein the corrosion inhibitor additive comprises an organic corrosion inhibitor additive.

7. The article of claim 6, wherein the organic corrosion inhibitor additive comprises at least one functional group capable of ligating the surface of the reflective metal layer surface.

8. The article of claim 7, wherein the organic corrosion inhibitor additive comprises an aromatic succinic acid compound.

9. The article of claim 1, wherein the corrosion inhibitor additive comprises a combination of at least one inorganic corrosion inhibitor additive and at least one organic corrosion inhibitor additive.

10. The article of claim 1, wherein the bead bond layer comprises 0.5-20% by weight of corrosion inhibitor additive.

11. The article of claim 1, wherein the bead bond layer comprises one or more additional additives.

12. The article of claim 11, wherein the one or more additional additives comprises aluminum flakes.

13. The article of claim 1, wherein the thermoplastic polymeric carrier layer has been removed to expose the transparent microspheres and portions of the reflective metal layer and form a retroreflective article.

14. The article of claim 13, wherein the article has improved stain resistance compared to an article without a corrosion inhibitor additive in the bead bond layer.

15. A method of preparing a retroreflective article comprising:
providing a thermoplastic polymeric carrier layer with a first major surface and a second major surface;
providing transparent microspheres;
partially embedding the transparent microspheres into the first major surface of the thermoplastic polymeric carrier layer such that the beads at least partially protrude from the first major surface of the thermoplastic polymeric carrier layer;
depositing a metal reflective layer on the first major surface of the thermoplastic polymeric carrier layer and the exposed surface of the partially embedded transparent microspheres;
providing a bead bond composition, the bead bond composition comprising at least one bead bond polymer and a corrosion inhibitor additive; and
applying the bead bond composition to the deposited metal reflective layer, to form a bead bond layer, wherein at least a portion of the corrosion inhibitor additive migrates through the reflecting metal layer to the surface of the reflective metal layer opposite to the surface in contact with the bead bond layer.

16. The method of claim 15, wherein providing a bead bond composition comprises mixing the at least one bead bond polymer or prepolymer with the corrosion inhibitor additive.

17. The method of claim 15, wherein the bead bond composition further comprises a solvent, and wherein applying the bead bond composition to the deposited metal reflective layer, to form a bead bond layer further comprises drying and/or curing of the composition.

18. The method of claim 15, further comprising applying an additional layer to the bead bond layer.

19. The method of claim 15, further comprising removing the thermoplastic polymeric carrier layer, to form a retroreflective article.

* * * * *